(No Model.)
O. D. WOODRUFF.
MEAT CUTTER.
No. 507,195. Patented Oct. 24, 1893.
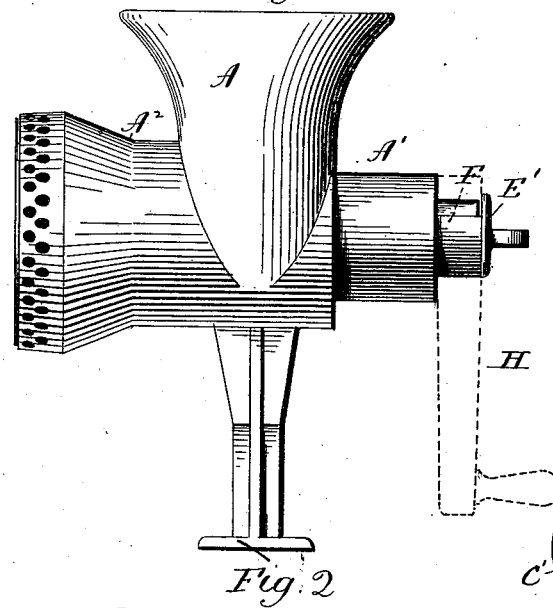
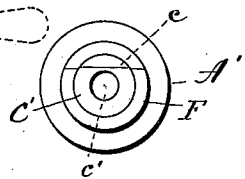
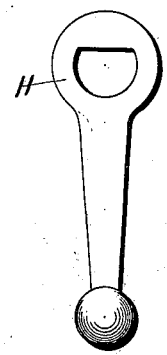
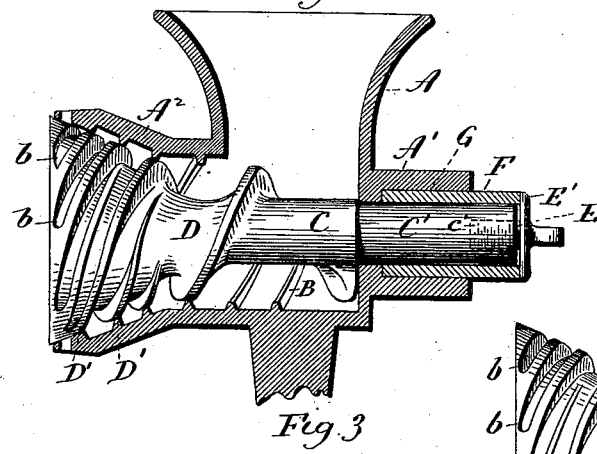
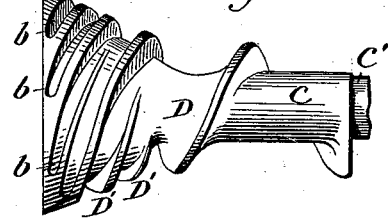
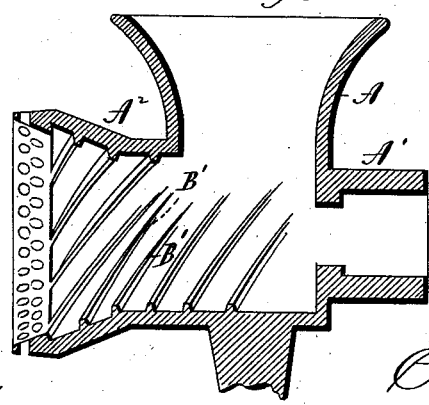
Witnesses
Oliver D. Woodruff
Inventor

UNITED STATES PATENT OFFICE.

OLIVER D. WOODRUFF, OF SOUTHINGTON, CONNECTICUT.

MEAT-CUTTER.

SPECIFICATION forming part of Letters Patent No. 507,195, dated October 24, 1893.

Application filed January 10, 1893. Serial No. 457,964. (No model.)

*To all whom it may concern:*

Be it known that I, OLIVER D. WOODRUFF, of Southington, in the county of Hartford and State of Connecticut, have invented new Improvements in Meat-Cutters; and I do hereby declare the following, when taken in connection with accompanying drawings and the letters of reference marked thereon, to be a full, clear, and exact description of the same, and which said drawings constitute part of this specification, and represent, in—

Figure 1, a view in side elevation of a meat-cutter constructed in accordance with my invention; Fig. 2, a view thereof in vertical longitudinal central section; Fig. 3, a similar view of the shell of the cutter with the combined feed-screw and cutter-head removed; Fig. 4, a detached view in side elevation of the combined feed-screw and cutter-head; Fig. 5, a detail view in end elevation showing the ends of the hub of the shell, the bushing located in the counter-bore thereof, and the face outer end of the bearing of the feed-screw and cutter-head; Fig. 6, a broken view of the handle showing the D-shaped opening in its inner end.

My invention relates to an improvement in meat-cutters, the object being to produce a simple and compact device, having a large capacity for thoroughly cutting all kinds of meats, discharging the same so completely that it is practically self-cleaning, and composed of so few and such simple parts that it is very readily taken to pieces and put together.

With these ends in view, my invention consists in the combination, in a meat-cutter, of a shell having a conical open end flaring outward, internal spirally arranged cutting ribs multiplying from its inner end outward, and terminating in the same vertical plane near the outer end of the said open end of the shell, and a circular band of radial perforations formed between the said ends of the ribs and the edge of its said end; and a combined cutter-head and feed-screw having its outer end made conical and flaring outward in conformity with the internal configuration of the conical outwardly flaring end of the shell, and constructed with spirally arranged grooves multiplying from its inner end outward, and extending beyond the forward terminations of the said ribs, and under the said perforations, and stopping just within its extreme end, which closes the said open end of the shell from which the minced meat is laterally discharged.

My invention further consists in certain details of construction as will be hereinafter described, and pointed out in the claims.

The shell of my improved cutter is cast in one piece, and comprises a hopper A, of ordinary form, a hub A', located at its inner end, and a conical open end $A^2$, flaring outward. The said shell is also constructed with internal, spirally arranged ribs B, beginning at a point beneath its said hopper A, and extending forward into its conical open end $A^2$, and terminating in the same vertical plane, at a point near the end thereof, the said ribs multiplying from the inner portion of the shell outward, as shown by Fig. 3 of the drawings, in which additional ribs, which are designated as B' B', are shown as starting in about midway the length of the ribbed portion of the shell. The combined cutter-head and screw-feed C, has its outer end made conical and outwardly flaring, in conformity to the internal form of the conical outwardly flaring open end $A^2$, of the shell. It is formed with grooves D, which multiply from its inner portion outward, and terminate just within its extreme outer end, which as shown in Figs. 1 and 2 of the drawings, closes the extreme end of the portion $A^2$ of the shell. It will be observed by reference to Fig. 4 of the drawings, that the outer ends of these grooves grow gradually shallower, and finally terminate in cutting shoulders which extend transversely to them. The multiplication of the grooves is shown by extra threads marked D' D', in Fig. 4 of the drawings. I do not wish to be understood as limiting myself to any particular way of forming the ribs in the shell, or the grooves in the combined cutter-head and feed-screw, further than that I design to multiply them as they approach the discharging end of the device.

By constructing the shell and combined cutter-head and feed-screw as described, the grooves in the latter will extend clear beyond the ribs in the former when the parts are put together for use, so that the outer ends of the said grooves will co-operate with the perforations in the shell rather than with the ribs thereof.

In the operation of my improved cutter, the meat is first cut coarsely by the co-action of the inner ends of the ribs and grooves within the inner end of the shell, and at the inner end of the combined cutter-head and feed-screw. It is then moved along and distributed throughout the multiplied grooves, and as between the multiplied ribs which co-act to cut it finer. Finally, it is forced to leave the ribbed portion of the shell altogether by the termination of the outer ends of the said ribs, but is thereafter exclusively contained for a short time, in the extreme forward ends of the grooves, from which it is forced radially outward, by the pressure behind it, into the perforations in which it is given a final draw-cut by the side-walls and cutting-shoulders $b$, of the grooves, which draw the meat under the said perforations. The device works freely and easily, because the open end of the shell being flared outwardly, and the outer end of the combined cutter-head and feed-screw being correspondingly shaped, the pressure within the device is relieved very much, and the clogging which is apt to occur in a device having its shell and cutter tapered the other way avoided. Furthermore, by employing a very narrow band of perforations in the shell, which thereto must flare outwardly, the draw-cuts to which the meat is subjected just before its discharge, are comparatively short, and are therefore effective, whereas, when the draw-cuts are longer, and under a long series of perforations, the meat is not cut as squarely, and is very liable to string and clog. The meat is entirely cleared, as has been explained, from the ribbed portion of the shell in its forward progress through the same, and the outer ends of the grooves in the combined feed-screw and cutter-head are so shallow that the meat is readily cleared from them by the action of the perforations, which, when it once enters them, operates to lift it, so to speak, out of the outer ends of the grooves, whereby the machine becomes self-cleaning, and discharges itself completely, so that the annoyance of picking bits of meat out of the machine after it has been used, is done away with.

Another object of my invention relates to the adjustment of the combined feed-screw and cutter-head, and the application of a crank-handle thereto. It consists in constructing the outer end of the combined cutter-head and feed-screw with a long journal $C'$, adapted in length to project beyond the outer end of the hub $A'$, where it is faced off, as shown by $c$, in Fig. 5 of the drawings. The outer end of the bearing is constructed with a central longitudinal screw-hole $c'$, receiving a thumb-screw E, having a circular head $E'$, which impinges against the outer end of a segmental bushing F, inserted into a counter-bore G, formed in the hub $A'$ before mentioned. This bushing is made in length so that when its inner end is seated against the bottom of the said counter-bore, its outer end will project a little beyond the end of the journal $C'$, as shown by Fig. 2 of the drawings. It will be clear that by turning the said thumb-screw from left to right, the combined cutter-head and feed-screw may be drawn rearward into the shell by the impingement of the collar of the thumb-screw against the end of the bushing, until the surfaces of the said shell and combined cutter-head and feed-screw are in the right contact for their most advantageous co-action in cutting up the meat, and they are maintained in this relation by turning the said thumb-screw as described, whereby wear is taken up. On the other hand, by turning the said thumb-screw in the opposite direction, the combined cutter-head and feed-screw will be released and may be removed from the shell. The crank-handle H, of the cutter is provided at its end with a D-shaped opening $H'$, adapting it to fit over the projecting ends of the bushing and bearing, on which it is retained by the collar of the thumb-screw. It will be noticed in Fig. 5 of the drawings, that the bushing is shaped with reference to the faced end of the journal $C'$, so that its edges fall a little below the faced portion thereof. This is done so that the crank-handle will have no hold on the bushing to turn the same independent of the combined cutter-head and feed-screw, for in that case the adjusting-screw $E'$, would turn with it, and change the adjustment of the device.

Having fully described my invention, what I claim as new, and desire to secure by Letters Patent, is—

1. The combination in a meat-cutter, of a shell having a conical open end flaring outward, internal, spirally arranged cutting ribs multiplying from its inner end outward, and terminating in the same vertical plane, and a narrow circular band of radial perforations formed between the said ends of the ribs and the edge of its said end; and a combined cutter-head and feed-screw having its outer end made conical and flaring outward in conformity with the internal configuration of the conical, outwardly flaring end of the shell, and constructed with spirally arranged grooves multiplying from its inner end outward, and extending beyond the forward terminations of the said ribs, and under the said perforations, and stopping just within its extreme end, which closes the said open end of the shell from which the minced meat is laterally discharged, substantially as described, and whereby the minced meat is cleared from the ribbed portion of the shell and left in the outer ends of the grooves in the said combined feed-screw and cutter-head from which grooves it is discharged through the said perforations.

2. In a meat-cutter, the combination with a shell provided at its inner end with a counter-bored hub, of a combined feed-screw and cutter-head mounted in the said shell, and constructed at its inner end with a bearing which projects through the said hub, and has its projecting end faced off and furnished with a longitudinal screw-hole; of a segmental bushing adapted to be set into the said counter-bore, and projecting therefrom beyond the projecting end of said bearing; a crank-handle having an opening adapting it to fit over the said bushing and bearing, and a thumb-screw entering the screw-hole in the bearing, and impinging against the outer edge of the bushing, substantially as described.

In testimony whereof I have signed this specification in the presence of two subscribing witnesses.

OLIVER D. WOODRUFF.

Witnesses:
GEO. D. SEYMOUR,
FRED C. EARLE.